United States Patent [19]

Berger et al.

[11] Patent Number: 4,945,242

[45] Date of Patent: Jul. 31, 1990

[54] PHOTOSENSITIVE DEVICE AND IMAGE DETECTOR INCLUDING SUCH A DEVICE, ESPECIALLY TWO-ENERGY IMAGE DETECTOR

[75] Inventors: Jean-Luc Berger; Marc Arques, both of Grenoble, France

[73] Assignee: Thomson-CSF, Paris, France

[21] Appl. No.: 314,435

[22] Filed: Feb. 22, 1989

[30] Foreign Application Priority Data

Feb. 26, 1988 [FR] France ............... 88 02366

[51] Int. Cl.[5] .............. G01T 1/20; H01L 31/10
[52] U.S. Cl. ............... 250/367; 250/370.11; 250/578.1
[58] Field of Search .......... 250/367, 370.08, 370.04, 250/370.11, 578; 357/32, 30; 358/213.11

[56] References Cited

U.S. PATENT DOCUMENTS 3,660,667  5/1972  Weimer ........................ 250/209
4,581,625  4/1986  Gay et al. ..................... 357/30
4,672,454  6/1987  Cannella et al. ............. 250/370.09

FOREIGN PATENT DOCUMENTS 0223545  5/1987  European Pat. Off. .
2593343  1/1986  France .

Primary Examiner—Janice A. Howell
Assistant Examiner—Richard Hanig
Attorney, Agent, or Firm—Roland Plottel

[57] ABSTRACT

The invention relates to a photosensitive matrix (2) permitting the simultaneous acquisition of two images, especially radiological images, and which offers at the same time a maximum sensitivity and a maximum image resolution. The matrix (2) of the invention includes photosensitive points (P1 to P9) disposed in lines and in columns. According to a feature of the invention, each photosensitive point (P1 to 9) includes two photosensitive cells (JA, JB), the first ends (3A, 3B) of which are connected to a same line conductor (L1 to L3), and the second ends (4A, 4B) of which are connected to different column conductors. FIG. 1.

18 Claims, 3 Drawing Sheets

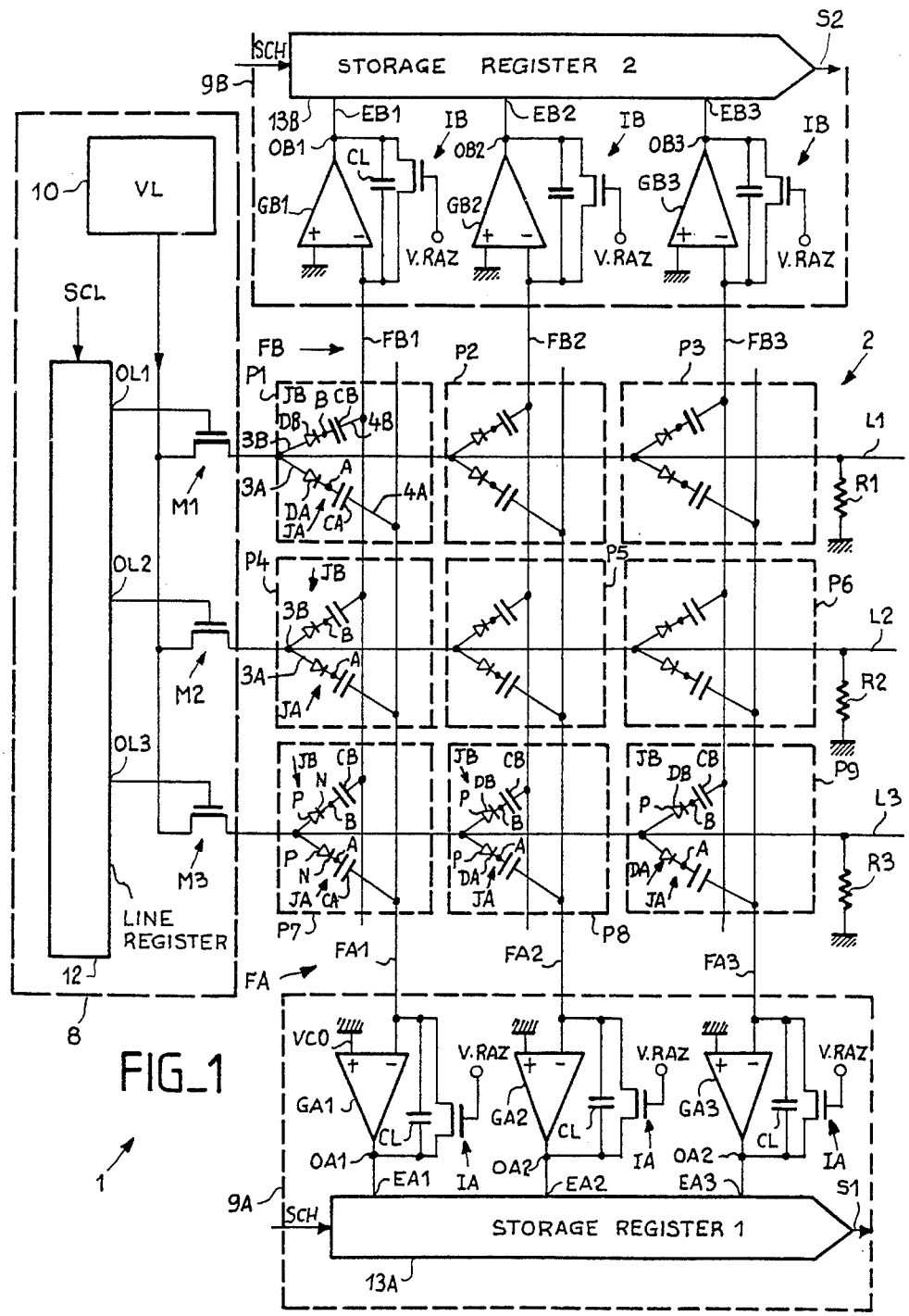
FIG_1

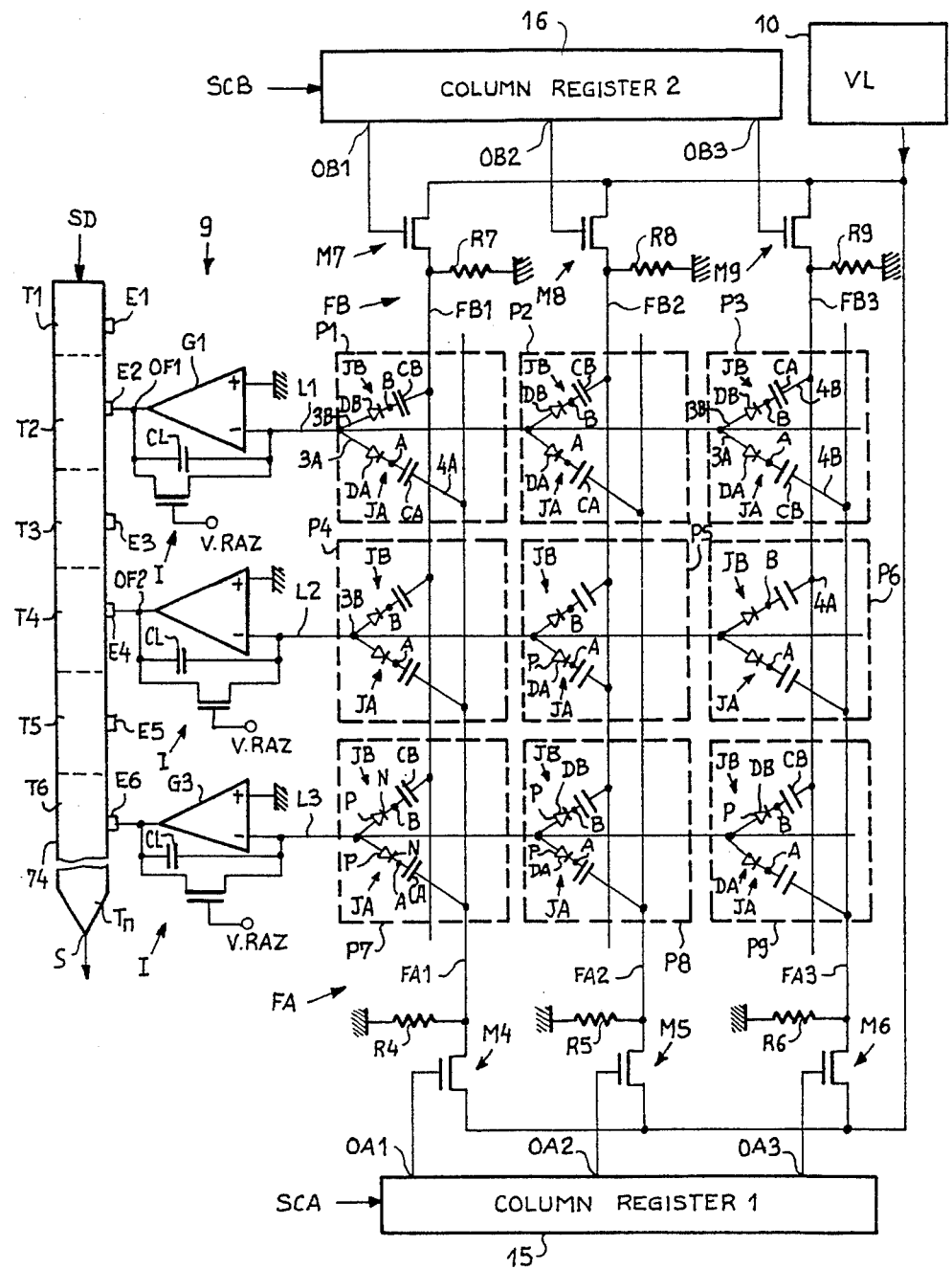
FIG_2

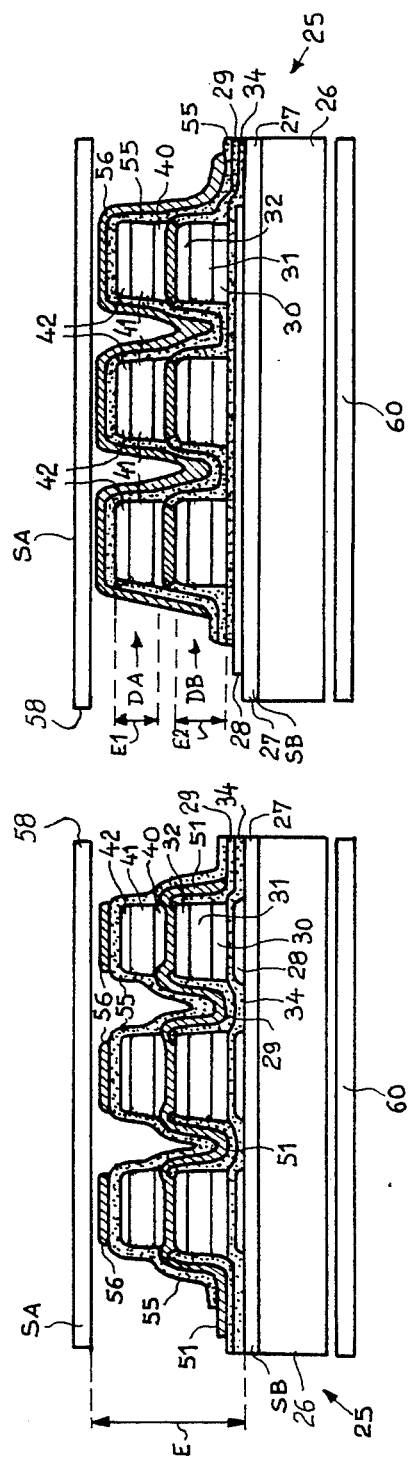

PHOTOSENSITIVE DEVICE AND IMAGE DETECTOR INCLUDING SUCH A DEVICE, ESPECIALLY TWO-ENERGY IMAGE DETECTOR

FIELD OF THE INVENTION

The invention relates to the processing of images by means of photosensitive elements, and relates more particularly to a matrix arrangement of photosensitive elements permitting the simultaneous acquisition of a plurality of images. The invention also relates to a radiation detector utilizing such an arrangement of photosensitive elements, especially an X-ray detector permitting the simultaneous processing of two images each corresponding to a different energy spectrum of the X-rays.

DESCRIPTION OF THE PRIOR ART

Taking, for example, the field of radiology and of radiodiagnostics, it is beneficial to produce, in the course of the examination of a patient, two plates each corresponding to a different energy of the X-rays, in such a manner as to obtain specific information relating to certain substances, by differentiation of the plates. The images of this type, or two-energy images, constructed currently by radiologists, are obtained from two images of the safe zone of the patient which are formed in succession, either by modifying from one image to the other the conditions of the X-rays (different energy spectrum of the X-rays), or by utilizing sensors sensitive to different energy windows of the X-rays, this being obtained, for example, by changing the type of scintillator employed to convert the X-rays into a visible light to which a photographic film is exposed (the scintillator is formed of a substance which has the property of being excited by X-rays and of emitting, in response to this excitation, a radiation of wavelength which is visible or near visible; the scintillator has a maximum conversion yield, or maximum sensitivity, within a certain energy range of the X-rays, this energy range being determined by the nature of the substance which constitutes the scintillator).

These methods of the prior art exhibit the disadvantage of requiring mechanical movements, especially of the film or of the sensor, in order to take two successive plates. Another significant disadvantage resides in the fact that these images obtained in succession do not permit avoidance of the movements of the patient; this results in a poor superposability of the two plates and consequently a poor spatial resolution.

One of the objects of the invention is to permit the simultaneous processing of two images, by means of a photosensitive sensor device of the surface type and thus not necessitating any mechanical movement during the recording of images, and permitting the obtaining of perfectly superposable images. Such a photosensitive device is particularly well suited to a utilization in radiology, for the processing of two images referred to as two-energy images, each corresponding to a different energy spectrum of the X-rays, for example from a single X-ray irradiation of an object or patient.

It is known to construct matrices of photosensitive elements of high capacity, for example several million points. In a conventional manner, these photosensitive matrices include an array of line conductors and an array of column conductors. At each crossing of a line conductor and of a column conductor, there is disposed a photosensitive zone or point, these photosensitive points thus being organized likewise in lines and in columns. The number of photosensitive points within a given surface determines the resolution of an image. Each photosensitive point is connected between a line conductor and a column conductor: in fact, to each line conductor there are connected as many photosensitive points as there are columns of the latter, and to each column conductor there are connected as many photosensitive points as there are lines of the latter.

The number of photosensitive points within a given surface determines the resolution of the image. In order to reduce the space requirement of a photosensitive point, so as to increase the resolution by accommodating a larger number of photosensitive points within a given surface, matrices of photosensitive elements have been proposed in which each photosensitive point consists of a photodiode in series with a capacitor. A French patent no. 86/00656 published under no. 2,593,319 describes a reading process, and describes the detailed operation of a photosensitive matrix, each photosensitive point of which consists of a photodiode in series with a capacitor, as mentioned hereinabove. Another French patent no. 86/00716 published under no. 2,593,343 relates to a matrix having an array of photosensitive points each consisting of a photodiode and a capacitor in series, as mentioned hereinabove and this patent describes a process for the manufacture of such a photosensitive matrix, as well as a process for the reading of this matrix and an application of this matrix for the taking of images, especially radiological images. One of the advantages of the type of structure described in this patent is that of permitting the construction of matrices of large dimensions and thus applicable in an advantageous manner to radiology, on account of the fact that the deposits in thin layers of amorphous silicon, for example, are now well controlled. In this patent, the structure exhibited includes a scintillator which is subjected to X-rays. In response to these X-rays, the scintillator emits a second radiation, to which the photodiodes are sensitive.

In order to obtain two-energy images by means of a matrix of photosensitive elements as described in French patent no. 86/00716 cited hereinabove, it is sufficient to add a second scintillator so as to have a structure with two scintillators, each scintillator having an optimal sensitivity for X-rays of different energy. It is, moreover, necessary to introduce into this structure two additional levels in "opaque-transparent" chequered configurations, which are disposed between the scintillators and the photodiodes, in such a manner that certain photosensitive points are exposed only to the light originating from the scintillator which is allocated to them, and that the other photosensitive points are exposed only to the light originating from the other scintillator.

This solution, which is relatively simple to implement technologically, does, however, exhibit the disadvantage of supplying two two-energy images which have separately a resolution and a space factor which are one half as compared with the single-energy images, on account of the fact that, on two adjacent photosensitive points, one is affected by the first image and the other by the second.

SUMMARY OF THE INVENTION

Further, another object of the invention is to permit the construction of photosensitive detectors, each photosensitive point of which is capable of storing two different information items. This permits, especially, the construction of a radiological image detector capable of obtaining simultaneously two images each corresponding to a different energy of the X-rays and each exhibiting a resolution and a space factor which are equivalent to single-energy images.

According to the invention, a photosensitive device including an array of photosensitive points is defined in that each photosensitive point includes two superposed photosensitive elements each producing a signal proportional to their respective illumination.

BRIEF DESCRIPTION OF THE DRAWINGS

The invention will be better understood, and other features and results of the invention will emerge from the description which follows, which is given by way of non-limiting example and illustrated by the three accompanying figures, in which:

FIG. 1 is a diagram showing, by way of non-limiting example, a photosensitive device according to the invention;

FIG. 2 is a diagram showing a second version of the photosensitive device of the invention;

FIGS. 3a and 3b are lateral cross-sections, along two orthogonal directions, of a radiological image detector utilizing the photosensitive device shown in FIG. 1.

DETAILED DESCRIPTION OF THE INVENTION

FIG. 1 shows the electrical diagram of a photosensitive device 1 according to the invention. The photosensitive device comprises a plurality of photosensitive points P1, P2, ... P9 which are disposed in lines and in columns in a manner which is conventional per se, with a view to constituting a photosensitive matrix 2. In the non-limiting example described, the number of photosensitive points P1 to P9 is limited to 9 according to a 3×3 matrix assembly in order to simplify FIG. 1, but within the spirit of the invention this matrix assembly may have a far greater capacity.

According to a feature of the invention, each photosensitive point P1 to P9 consists of two photosensitive cells JA, JB. Each photosensitive cell JA, JB includes a photosensitive element DA, DB connected in series with a capacitor CA, CB.

According to another feature of the invention, at least the two photosensitive elements DA, DB of a same photosensitive point from P1 to P2 are superposed, as is further explained in a following portion of the description relating to a construction in which the photosensitive elements DA, DB and the capacitors CA, CB consist of layers which are all superposed.

The photosensitive device 1 further includes line conductors L1 to L3 and, according to another feature of the invention, it includes two arrays FA, FB of column conductors FA1 to FA3 and FB1 to FB3. The line conductors L1 to L3 are connected to an addressing device 8, and the first and second arrays FA, FB of column conductors are connected respectively to a first and a second reading and multiplexing device 9A, 9B. The photosensitive cells JA, JB have a first end 3A, 3B and a second end 4A, 4B, by which these photosensitive cells are connected to the line conductors L1 to L3 and to the column conductors FA1 to FA3 and FB1 to FB3. For a same photosensitive point, the two photosensitive cells JA, JB are connected by one end to a same line conductor, and are connected by the other end to column conductors of a different array. Thus, for example, the first photosensitive point P1 includes a first and a second cell JA, JB, the first ends 3A, 3B of which are joined to the same first line L1. The second end 4A of the first photosensitive cell JA is joined to a column conductor FA1 of the first array FA, and the second end 4B of the second photosensitive cell JB is connected to a column conductor FB1 belonging to the second array FB. The first and second photosensitive cells JA, JB of the other photosensitive points P2 to P9 are connected in a similar manner to the line conductors L1 to L3 and to the column conductors FA1 to FA3 and FB1 to FB3, at the intersection of which there is, in practice, situated the photosensitive point consisting of the two superposed photosensitive cells JA, JB.

It is thus possible, with each one of the photosensitive points P1 to P9, to obtain, whether simultaneously or not, two different information items, in such a manner, for example, as to form two radiological images each corresponding to a different energy of the X-rays. This may be obtained by converting the X-rays into visible light and by exposing each photosensitive element DA, DB to the light having the desired origin, whence the following results for each photosensitive point P1 to P9:

that, on the one hand, within a zone A situated at the junction of the first photosensitive element DA and of the capacitor CA, it is possible to store a first information item in the form of a quantity of charge proportional to the illumination of the first photosensitive element DA; and that it is possible on the other hand, within a second zone B formed at the junction between the second photosensitive element DB and the capacitor CB, to store a second information item in the form of a second quantity of charge proportional to the illumination of the second photosensitive element of DB.

In the non-limiting example of the description, the photosensitive elements DA, DB are photodiodes. Each photodiode is in series with a capacitor CA, CB in order to constitute a photosensitive cell identical to the photosensitive cells already described in the French Patent Applications No. 86/00656 and No. 86/00716, cited previously, and which describe in detail the operation of such photosensitive cells as well as the operation of means which can be used to obtain the storage and the reading of the charges or information items; consequently, these two patent applications (No. 86/00656 and No. 86/00716) must be considered as forming part of the present description.

Nevertheless, it is recalled that for each photosensitive cell JA or JB, the principal phases of the operation are the following:

(1) phase of reverse biasing of the photodiode;

(2) phase of illumination of the photodiode (in consequence, for example, of a flash of X-rays for the irradiation of a patient, and conversion of the X-rays into a radiation of wavelength which is visible or near visible); storage of the information item corresponding to the illumination;

(3) reading phase (forward biasing of the photodiode;

(4) phase of reset to level of the voltages at the terminals of the photodiode, obtained either by means of an electrical biasing pulse applied to the line conductor or by means of a calibrated standard illumination, or by means of an intense light flash.

With the present invention, although each photosensitive point P1 to P9 includes two photosensitive cells JA, JB and consequently offers two information items, the operations hereinbefore mentioned may be obtained in a manner which is similar in its principle to those described in the two patent applications cited hereinabove.

In the non-limiting example described, the line addressing device includes a pulse generator 10 producing a pulsed voltage VL intended to be applied to the line conductors L1 to L3. To this end, the pulse generator 3 is connected to the line conductors L1 to L3 via MOS transistors M1, M2, M3, forming line switches controlled by outputs OL1, OL2, OL3 of a shift register or line register 12. The line register 12 is controlled by a line shift control signal SCL. Thus, in a conventional manner, when a line of photosensitive points P1 to P3, or P4 to P6 or P7 to P9 is selected, the corresponding line conductor L1 to L3 is connected to the pulse generator 10, in such a manner that the pulsed voltage VL is applied to all the photosensitive points connected to this line conductor. It should be noted that, in order to maintain the lines L1 to L3 at a fixed potential, when the line switches M1, M2, M3 are open (not conducting), each line conductor L1, L2, L3 is connected to ground by a resistor R1 to R3; these resistors R1 to R3 have a high value in comparison with the resistance offered by the switches M1 to M3 when the latter are closed (conducting condition).

On the other hand, the reading and multiplexing means 9A, 9B include reading amplifiers which are integrating amplifiers GA1 to GA3 and GB1 to GB3, to which the column conductors are connected:

each column conductor FA1 to FA3 of the first array FA is connected to the negative input "−" of an operational amplifier GA1 to GA3; each one of these amplifiers is connected as an integrator by means of an integrating capacitor CL connected between the negative input "−" of the amplifier GA1 to GA3 and the output OA1 to OA3 of this amplifier. The second input or positive input "−" of each amplifier GA1 to GA3 is connected to a column reference potential VCO which may be ground, for example. Each integrating amplifier GA1 to GA3 further includes a switch IA referred to as a reset to zero switch, connected in parallel with the integrating capacitor CL; the reset to zero switches IA consisting of MOS transistors controlled by reset to zero signals V.RAZ. The reset to zero switch IA of a given integrating amplifier GA1 to GA3 is maintained "closed" or "conducting" in such a manner as to short-circuit the integrating capacitor CL, except during the reading sequence of the photosensitive cell which is connected to this amplifier. The outputs OA1, OA2, OA3 of the amplifiers GA1, GA2, GA3 are connected to a first analogue data acquisition device 13A, which consists, for example, of a shift register with parallel inputs EA1, EA2, EA3 and a series output S1 for example of the CCD type.

The column conductors FB1 to FB3 of the second array FB are connected in a similar manner to integrating amplifiers GB1, GB2, GB3. In the same manner as in the case of the column conductors of the first array FA, these integrating amplifiers GB1 to GB3 each include an integrating capacitor CL and a reset to zero switch IB which are connected in parallel between the negative input "−" and the output OB1 to OB3 of these integrating amplifiers GB1 to GB3. The outputs OB1 to OB3 of these integrating amplifiers are connected respectively to the inputs EB1, EB2, EB3 of a second acquisition register 13B, which likewise consists of a shift register of the type having a parallel input and a series output S2.

As compared with the photosensitive matrices described in the French Patent Applications 86/00656 and 86/00716 which have already been mentioned, the matrix arrangement of the invention differs in that each photosensitive point P1 to P9 can store two different information items, one at the point A and the other at the point B of the photosensitive cells JA, JB, in such a manner as to permit the simultaneous acquisition of the information items relating to two images.

On account of the fact that, on the one hand, for a same photosensitive point P1 to P9, the two photosensitive cells JA, JB are connected to a same line conductor, and that, on the other hand, the first photosensitive cells A are connected to column conductors FA1 to FA3 different from the column conductors FB1 to FB3 to which the second photosensitive cells JB are connected, the operation at the location of any one of these photosensitive cells JA or JB, each consisting of a photosensitive element and of a capacitor in series, remains fundamentally the same as that which is explained in the two patent applications mentioned hereinabove; the difference is that, instead of having only output signals relating to the information items stored at the various first points A at the output S1 of the first acquisition register 13A for example, it is furthermore possible to have, whether or not simultaneously, at the output S2 of the second acquisition register 13B, signals relating to the information items stored at the various second points B.

Thus, for example, the global operation of the photosensitive device 1, the diagram of which is represented in FIG. 1, may be summarized in the following phases:

(1) a phase of biasing in reverse: the pulse generator passes to all the line conductors L1 to L3, simultaneously or with a shift, a pulse the effect of which is to bias in reverse the photodiodes DA, DB;

(2) then, a phase of illumination of all the sensitive points from P1 to P9 by the useful signal; the useful signal originating from an X-ray flash which, in consequence of a wavelength conversion by means of two scintillators (shown in FIG. 3), determines the illumination of all the photosensitive points P1 to P9, and for each of these photosensitive points the storage of an information item at the points A and B;

(3) a phase of reading of the point A and the point B of the photosensitive points connected to a same line conductor, and which may be simultaneous for the points A and B: all the information items stored at the points A on the one hand, and all the information items stored at the points B on the other hand, for the photosensitive cells JA, JB connected to a same line conductor L1 to L3, are transferred respectively into the first and the second acquisition register 13A, 13B; these registers 13A, 13B are then unloaded under the control of a shift signal SCH applied to each one of the acquisition registers 13A, 13B in such a manner that the information items are then transferred into a conventional main memory (not shown);

(4) the phase 3 hereinabove is repeated line after line for all the line conductors L1 to L3: the two images sought are thus obtained;

(5) there is then performed a general reset to level common to all the photosensitive points P1 to P9.

In the non-limiting example described and represented in FIG. 1, all the photosensitive cells JA, JB are disposed in the same manner in relation to the line conductor L1 to L3 to which they are connected. However, it must be understood that, within the spirit of the invention, one or the other of these two photosensitive cells JA, JB, or both, may be arranged in a manner different from those represented by FIG. 1, where the photodiodes DA, DB are connected to a line conductor L1 to L3 by their anode P, the capacitors CA, CB being connected to the column conductor FA1 to FA3 and FB1 to FB3:

thus, for example, within a photosensitive cell JA, JB, the positions of a photodiode DA, DB and of a capacitor CA, CB may be reversed, that is to say that the capacitor CA, CB may be connected to a line conductor L1 to L3 and the photodiode DA, DB to a column conductor;

likewise, for the photosensitive cells, JA, JB, it is also possible, irrespective of the relative positions of the photodiodes DA, DB and of the capacitors CA, CB, to reverse the direction of conduction of the photodiodes DA, DB (of course, in this case the polarity of the pulses applied to the photodiodes is also reversed in relation to the polarities represented in the Patent Applications No. 86/00656 and No. 86/00716) and to connect either their anodes P or their cathodes N to the capacitor CA, CB.

These different possible arrangements of the photosensitive cells JA, JB do not modify, in its principle, the operation of the latter. Further, it is possible to provide a different organization, which requires only a single series of integrating amplifiers or reading amplifiers; the diagram of such an organization is represented in FIG. 2.

FIG. 2 shows the diagram of a second version of the photosensitive device 1 of the invention, in which, in contrast to the example represented in FIG. 1, the reading amplifiers are connected to the line conductors L1 to L3.

The photosensitive points P1 to P9 and the two photosensitive cells JA, JB which they each include are organized in the same manner as in the first version.

Each line conductor L1 to L3 is connected to the negative input "—" of an integrating amplifier G1 to G3. Each one of these integrating amplifiers includes, as in the preceding version, an integrating capacitor CL and reset to zero switch I, which are connected in parallel, and which are connected on one side to its negative input "—" and on the other side to its output OF1, OF2, OF3. The reset to zero switches I consist, as in the preceding example, of MOS transistors controlled by reset to zero signals V.RAZ. The second input or positive input "+" of each amplifier G1 to G3 is connected to ground, that is to say to the column reference potential VCO. The outputs OF1, OF2, OF3 of the integrating amplifiers G1 to G3 are connected to a third reading and multiplexing device or analogue data acquisition register 74, consisting of a shift register of the type, for example, including a number n of acquisition stages T1, T2..., Tn with parallel inputs E1, E2..., En and a series output S.

In the non-limiting example described, with a view to avoiding a superposition within a same acquisition stage of the signals corresponding to those stored at the point A and at the point B of same photosensitive point P1 to P9, two adjacent acquisition stages are intended to be charged in succession by a same output OF1 to OF3 of amplifier G1 to G3. To this end, the outputs OF1, OF2, OF3 are connected, for example, respectively to the second, fourth and sixth inputs E2, E4, E6 of the acquisition register 74, in such a manner as to load during a first period of time the acquisition stages T2, T3, T4 by the charges or information items contained within the first cells JA (photosensitive points P1 to P9 connected to a same line conductor L1 to L3); then to load within a second period of time the acquisition stages T1, T3, T5, by the information items contained within the second cells JB, after having undertaken a shift of the stages by means of a shift control signal SD applied to the third acquisition register 74.

The column conductors FA1 to FA3 and FB1 to FB3 are all connected to the pulse generator 10 via MOS transistors M4 to M9, forming column switches which are controlled by the outputs of two shift registers 15, 16 referred to as column registers. The first column register is controlled by a first column control signal SCA permitting the successive activation of the outputs OA1, OA2, OA3 which control respectively the three first column switches M4, M5, M6. The three first column switches M4, M5, M6 connect respectively to the pulse generator 10 the first, second and third column conductors FA1, FA2, FA3 of the first column array FA.

In the same manner as for the first column array FA, the second column register 16 is controlled by a column signal SCB permitting the successive activation of the outputs OB1, OB2, OB3. The outputs OB1, OB2, OB3 control respectively the column switches M7, M8, M9 which connect respectively the first, second and third column conductors, FB1, FB2, FB3 of the second column array FB. Thus, all the second ends 4A of the first photosensitive cells JA which are connected to a same column conductor FA1 to FA3 of the first column array FA are connected to the pulse generator 10 when this column conductor is selected by means of the first column register 15; and the second ends 4B of the second photosensitive cells JB connected to a same column conductor FB1 to FB3 of the second column array FB are connected to the pulse generator 10 when this column conductor is selected by the second column register 16.

In this second version of the invention, apart from the fact that the pulse generator 10 is now connected to the second ends 4A, 4B of the photosensitive cells JA, JB by the column conductors, the operation remains the same as in the preceding example, especially for the phase of reverse biasing, during which the pulse generator 10 passes a pulse to all the column conductors FA1 to FA3 and FB1 to FB3, simultaneously or with a time shift.

On the other hand, after the phase of illumination of the photosensitive points P1 to P9, the transfer into the third acquisition register 74 of the information items stored at the points A and B is performed simultaneously for all the photosensitive cells JA or JB connected to a same column conductor. Thus, for example: assuming that none of the outputs OB1, OB2, OB3 of the second column register 16 is active, and that only the first output OA1 of the first column register 15 is active, the column switch M4 is made conducting and the pulse (not shown) delivered by the pulse generator 10 is applied to the first column conductor FA1 of the first column array FA; consequently, the information items contained at the points A of all the photosensitive points affected by this column conductor (that is to say the first, fourth and seventh photosensitive points P1, P4, P7) are loaded into the integrating amplifiers G1, G2, G3 and transferred into the third acquisition register 74. A shift of the stages T1 to Tn of the third acquisition register 74 is then affected, with a view to permitting the acquisition of the information items contained at the point B of the same photosensitive points as previously, that is to say the first, fourth and seventh photosensitive points P1, P4, P7. To this end, the first output OA1 of the first column register 15 is deactivated, and it is the first output OB1 of the second column register 16 which is activated: the switch M7 is then made conducting and the pulse delivered by the generator 10 is then applied to the first column conductor FB1 of the second column array FB and consequently to the second photosensitive cells JB connected to this column conductor; consequently, the information items stored at the point B of the first, fourth and seventh photosensitive points P1, P4, P7 are, in their turn, loaded into the third acquisition register 74. The latter is then emptied of its content in favor of the main memory previously mentioned. Then, it is solely the second output OA2 of the first column register 15 which is activated, in order to effect the acquisition of the information items A stored by all the first cells JA connected to the second column conductor FB2 of the second column array FB; the operations which have just been described are repeated until the acqustion of all the information items A and B is complete.

FIGS. 3a and 3b are lateral cross-sections along two orthogonal directions, which show, by way of non-limiting example and in a diagrammatic manner, a preferred embodiment of a two-energy radiological image detector, comprising a matrix device of photosensitive elements of the type previously described with reference to FIGS. 1 or 2.

The image detector 25 includes a support or substrate 26, for example of glass. A layer of a scintillator substance 27 is deposited on the substrate 26. This scintillator substance is chosen as a function of its maximum sensitivity within a certain energy range of the incident X-rays For example gadolinium oxysulfide, doped with terbium, is known to have an optimal sensitivity for X-rays, the energy of which is in the order of 50 keV, and to emit, in response, a green light of wavelength 0.54 microns. Thus, for example, the scintillator layer 27 may consist of a gadolinium oxysulfide powder embedded in a thermosetting resin, in such a manner as to constitute a sheet. This sheet is then affixed to the substrate 26. The scintillator layer 27 has a thickness which is chosen to optimize the efficiency of production of photons, without an excessive loss in relation to the resolution; this thickness (not illustrated) may range from a few tens to a few hundreds of microns for radiological imagery applications.

A thin conductive layer 28 of conductive material, which is transparent or partially transparent to the light emitted by the scintillator layer 27, covers the latter, either directly or via, for example, an intermediate insulating layer (not shown) which permits, especially, the flattening of the upper surface of the scintillator layer 27 and the formation of a barrier to a diffusion of impurities. The thin conductive layer 28 may be, for example, of indium-tin oxide, and it is engraved in such a manner as to constitute column conductors, for example the column conductors FB1 to FB3 of the second column array FB.

On top of the conductive layer 28 there is found an insulating layer 34 intended to form the dielectric of the second capacitors CB. The insulating layer 34 which forms the dielectric is likewise transparent, and it consists, for example, of silicon nitride.

The dielectric layer 34 is, in its turn, covered by a stack of a plurality of layers 30, 31, 32 which, after engraving, constitute the second photodiodes DB mentioned previously. In the non-limiting example described, the second photodiodes DB are of the NIP type, that is to say that on the insulating layer 34 (intended to form a dielectric) there is found first of all the layer 30 of hydrogenated amorphous silicon, doped with an N-type impurity, for example with phosphorus. There are then found, on top of the layer 30 of N-doped silicon, the layer 31 of intrinsic hydrogenated amorphous silicon. There is then deposited on the layer 31 of instrinsic silicon a layer of hydrogenated amorphous silicon 32 doped with a P-type impurity, for example with boron. These last three layers 30, 31, 32 are engraved in accordance with a pattern of islets in such a manner as to constitute the second photodiodes DB; these second photodiodes DB in islet form are thus situated at each one of the crossing points between column conductors FA1 to FA3 and FB1 to FB3 and line conductors L1 to L3.

On top of the last layer 32 of P-doped silicon there is deposited a new insulating layer 29, which may consist, for example, of a same material as the insulating layer 34 which forms the dielectric of the second capacitors CB. Openings are formed in this last insulating layer 29, above the second photodiodes DB, in such a manner as to place the latter in contact with a layer of conductive material referred as the intermediate conductive layer 51 and which is engraved in order to constitute the line conductors L1 to L3.

If the previously mentioned reset to level of the voltages at the terminals of the photodiodes DA, DB is undertaken by means of an electrical pulse, the intermediate conductive layer 51 may be opaque, consisting, for example, of a deposit of chromium or of molybdenum. However, if the reset to level is undertaken by optical means, the intermediate conductive layer 51 must be transparent, of a same material, for example, as the conductive layer 28 forming the column conductors FB1 to FB3.

On top of the line conductors L1 to L3, that is to say of the intermediate conductive layer 51, there is found a second stack of three layers 40, 41, 42 forming a PIN deposit: these three successive layers 40, 41, 42 are, respectively, a layer of hydrogenated amorphous silicon doped with a P-type impurity, a layer of intrinsic hydrogenated amorphous silicon and a layer of hydrogenated amorphous silicon doped with a N-type impurity (for example with phosphorus). These last three layers 40, 41, 42 are engraved in accordance with an islet pattern in such a manner as to constitute the first photodiodes DA superposed on the second photodiodes DB.

On top of the first photodiodes DA there is formed the deposit of an insulating layer 55 which constitutes the dielectric of the first capacitors CA.

There is then found on top of the dielectric layer 55 of the capacitors CA an upper conductive layer 56, which is transparent and which consists, for example, of a same conductive material as the layer 28 with which the column conductors FB1 to FB3 belonging to the second column array FB are formed. This upper conductive layer 56 is engraved in such a manner as to constitute the column conductors FA1 to FA3 of the first column array FA.

Finally, opposite the substrate 26, a second layer of a scintillator substance 58 terminates the structure, and covers the upper conductive layer 56 on which it is affixed or pressed with a bond (not shown) transparent to the light.

The scintillator substance which forms the second scintillator layer 58 is chosen as a function of the energy range of the X-rays for which it exhibits a maximum sensitivity, this maximum sensitivity being exhibited, of course, for an energy range of the X-rays different from that of the first scintillator layer 27.

Thus, for example, in the case of the second scintillator layer 58, the latter may consist of yttrium oxide, in such a manner as to exhibit an optimum sensitivity for X-rays of 20 keV. The yttrium oxide of the second scintillator layer 58 may be doped, for example with terbium.

In this structure, it is noted that the photosensitive points of the matrix device are formed by superposed layers, stacked in the direction of a thickness E of the structure, in such a manner that, for a same photosensitive point, the two photosensitive cells JA, JB which form it, and especially the first and second photodiodes DA, DB, are perfectly superposed. Thus, for each photosensitive point, the lateral space requirement is a minimum, so that the photodiodes DA, DB may have a detecting surface which is as large as possible. Moreover, this structure is advantageous on account of the fact that the first and second photodiodes DA, DB must be sensitive to rays (of light) of differing origins; this is obtained by placing in a sandwich between the two scintillator layers 27, 58 the various superposed layers which constitute the first and second photosensitive cells JA, JB.

Assuming that the X-rays (not shown) arrive on the side of the scintillator layer 58 disposed opposite the substrate 26, this scintillator layer being referred to in the following part of the description as the first scintillator layer SA, having regard to the direction of propagation of the X-rays: the rays pass first of all through the first scintillator layer SA and the first photodiodes DA, and then pass subsequently through the second photodiodes DB and then the other scintillator layer 27, which is referred to in the following part of the description as the second scintillator layer SB.

The first scintillator SA absorbs principally X-rays having an energy range centered about 20 keV, for example, and it converts the X-rays which it absorbs into a radiation detectable by the amorphorus silicon. The second scintillator SB absorbs principally X-rays, the energy of which corresponds to its maximum sensitivity, which is situated at energies (for example 50 keV) which are different from those applicable in the case of the first scintillator SA, the X-rays absorbed being likewise converted into a radiation detectable by the amorphous silicon.

The first photodiodes DA situated in proximity to the first scintillator SA preferentially sense the light emitted by the first scintillator SA, and the second photodiodes DB situated in proximity to the second scintillator SB preferentially sense the light emitted by this second scintillator; each photodiode constitutes a screen between the other photodiode on which it is superposed and the scintillator close to which it is situated.

In a photosensitive material, for example amorphous silicon, a radiation and especially the light emitted by the scintillator layers SA, SB is absorbed or attentuated within the photosensitive material in such a manner that the energy transferred to this material decreases exponentially with the length of material traversed. The result of this is that, if the first and the second photodiodes DA, DB have similar thicknesses E1, E2, the light emitted by the first scintillator layer SA is absorbed and thus detected essentially by the first photodiodes DA; and that the light emitted by the second scintillator layer SB is absorbed and detected essentially by the second photodiodes DB. It should moreover be noted that, if the thicknesses E1, E2 of the photodiodes DA, DB are sufficient to absorb totally the radiation or light emitted by the scintillator layer which is the closer, what is obtained is a total separation between the information supplied by the first scintillator layer SA and the information supplied by the second scintillator layer SB, these information items being detected respectively by the first and second photodiodes DA and DB. Such a separation is, of course, useful only if the intermediate conductive layer 51 in which the line conductors are constructed is transparent. In this case, it is possible to perform, in a simple manner, a reset to level (RAN) of the optical type, which may be effected simultaneously for the two photodiodes DA, DB of a same photosensitive point and possibly for all the photosensitive points, using a light emitted by a single light source.

To this end, a light source 60, intended for a general reset to level, may be applied against the substrate 26, for example opposite the second scintillator SB. This light source 60 may consist of means known per se, for example of a luminous plate, or of an array of light-emitting diodes, or again of flash tubes, etc.

If the light source 60 is applied on the substrate 26, opposite the second scintillator SB, the substrate 26 must then itself be transparent. A conventional substrate of glass is perfectly suitable. The light source 60 may then consist of an array of light-emitting diodes (not shown) which is mounted in such a manner as to form a panel, as in the example described in a French Patent Application No. 86/06334.

According to another feature of the invention, with a view to promoting the general reset to level by means of a single light source 60, the latter emits a red light, that is to say a light of greater wavelength than the light emitted by the scintillators SA, SB; this tends to diminish the absorption of the light employed for the general reset to level in relation to the absorption of the light emitted by the scintillators SA, SB.

However, if the intermediate conductive layer 51 which constitutes the line conductors situated between the first and the second photosensitive cells JA, JB is opaque and does not transmit visible light (or near-visible light), it is preferable for the resets to level of the photodiodes DA, DB to be performed by electrical pulses.

The embodiment represented in FIGS. 3a, 3b is given by way, of an example which is in no sense limiting, and, in particular, the layers with which the first and second photosensitive cells JA, JB are constituted may be disposed in different orders, in such a manner as to constitute, for example, PIN-type or NIP-type photodiodes, or in such a manner as to modify the positions between the photodiode and the capacitor of a same photosensitive cell. It should moreover be noted that the photosensitive elements DA., DB may consist of NIPIN-type or PINIP-type phototransistors.

What is claimed is:

1. An image detector comprising a photosensitive device including a matrix of photosensitive points (P1 to P9), the photosensitive points (P1 to P9) being connected to line conductors (L1 to L3) and to column conductors (FA1 to FA3, FB1 to FB3), wherein each photosensitive point (P1 to P9) includes a first and a second photosensitive cell (JA, JB) each capable of storing an information item, the two photosensitive cells (JA, JB) being superposed; and a first and a second scintillator substance (27, 58) which are sensitive to different energies of an incident radiation and emitting visible or non-visible light in response to the incident radiation.

2. The image detector as claimed in claim 1, wherein the column conductors (FA1 to FA3, FB1 to FB3) are divided into two arrays (FA, FB), and wherein the first and the second photosensitive cells (JA, JB) of a same photosensitive point (P1 to P9) are connected by their first end (3A, 3B) to a same line conductor (L1 to L3) and are connected by their second end (4A, 4B) to a column conductor (FA1 to FA3, FB1 to FB3) of a different column array (FA, FB).

3. The image detector as claimed in claim 2, wherein each photosensitive cell (JA, JB) consists of a photosensitive element (DA, DB) in series with a capacitor (CA, CB).

4. The image detector as claimed in claim 3, wherein the photosensitive elements (DA, DB) are photodiodes.

5. The image detector as claimed in claim 3, wherein the photosensitive elements (DA, DB) are NIPIN-type or PINIP-type phototransistors.

6. The image detector as claimed in claim 2, wherein the line conductors (LA1 to LA3) are connected to an addressing device (8), and wherein, on the one hand, the column conductors (FA1 to FA3) of the first column array (FA) are connected to a first reading and multiplexing device (9A), and wherein, on the other hand, the column conductors (FB1 to FB3) of the second column array (FB) are connected to a second reading and multiplexing device (9B).

7. The image detector as claimed in claim 2, wherein the line conductors (L1 to L3) are connected to a reading and multiplexing device (74), and wherein the first and the second arrays (FA, FB) of column conductors (FA1 to FA3, FB1 to FB3) are each connected to an addressing device (8A, 8B).

8. The image detector as claimed in claim 2, wherein the first and second photosensitive cells (JA, JB) are carried by a substrate (26) and are each formed from a stack of semiconductor layers (30, 31, 32 and 40, 41, 42) and from an insulating layer (34, 55), all these layers being superposed on one another between two conductive layers (28, 58), one of which is engraved to constitute the column conductors (FB1 to FB3) of the second column array (FB) and the other of which is engraved to constitute the column conductors (FA1 to FA3) of the first column array (FA), and wherein the two stacks or cells (JA, JB) are separated by an intermediate conductive layer (51) with which the line conductors (L1 to L3) are constructed.

9. The image detector as claimed in claim 8, wherein the intermediate conductive layer (51) is transparent to light.

10. The image detector as claimed in claim 9, wherein the photosensitive elements (DA, DB) have substantially equal thicknesses (E1, E2).

11. The image detector as claimed in claim 9 or 10, which further includes a light source (60) permitting the performance of a general reset to level of the voltages at the terminals of the photosensitive elements (DA, DB).

12. The image detector as claimed in claim 8, wherein the intermediate conductive layer (51) is opaque to light.

13. The image detector as claimed in claim 1, wherein the two scintillator substances (27, 58) constitute a first and a second scintillator layer (SA, SB), between which the photosensitive device (1) is situated, in such a manner as to construct a sandwich structure.

14. The image detector as claimed in claim 13, wherein the photosensitive device (1) includes a substrate (26), the substrate (26) carrying photosensitive cells superposed by twos (JA, JB), the second scintillator layer (SB) being deposited on the substrate (26) and intercalated between the latter and the photosensitive cells (JA, JB).

15. The image detector as claimed in claim 14, which includes at least one light source (60) serving to perform a voltage reset to level of the photosensitive cells (JA, JB).

16. The image detector as claimed in claim 15, wherein the light source (60) emits a light having a greater wavelength than the light emitted by the scintillator layers (SA, SB).

17. The image detector as claimed in any one of claims 1 to 16, wherein the incident radiation is an X-ay radiation.

18. An image detector including a first and a second scintillator substance (27, 58) which are sensitive to different energies of an incident radiation and emitting visible or non-visible light in response to the incident radiation, which detector further includes a photosensitive device (1), said photosensitive device including a matrix of photosensitive points (P1 to P9), the photosensitive points (P1 to P9) being connected to line conductors (L1 to L3) and to column conductors (FA1 to FA3, FA1 to FB3), wherein each photosensitive point (P1 to P9) includes a first and a second photosensitive cell (JA, JB) each capable of storing an information item, the two photosensitive cells (JA, JB) being superposed.

* * * * *